United States Patent
Lee

(10) Patent No.: US 10,378,594 B2
(45) Date of Patent: Aug. 13, 2019

(54) WEDGE CLUTCH WITH CLAMSHELL CARRIER

(71) Applicant: SCHAEFFLER TECHNOLOGIES AG & CO. KG, Herzogenaurach (DE)

(72) Inventor: Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 231 days.

(21) Appl. No.: 15/634,445

(22) Filed: Jun. 27, 2017

(65) Prior Publication Data
US 2018/0372165 A1 Dec. 27, 2018

(51) Int. Cl.
*F16D 15/00* (2006.01)
*F16D 13/10* (2006.01)
*F16D 23/12* (2006.01)

(52) U.S. Cl.
CPC ............ *F16D 13/10* (2013.01); *F16D 15/00* (2013.01); *F16D 23/12* (2013.01)

(58) Field of Classification Search
CPC ........... F16D 13/10; F16D 15/00; F16D 13/20
USPC ............................................................ 192/77
See application file for complete search history.

(56) References Cited

U.S. PATENT DOCUMENTS

| | | | | |
|---|---|---|---|---|
| 827,475 | A | * | 7/1906 | Sturtevant |
| 1,412,606 | A | * | 4/1922 | Botts ................ F16D 13/10 192/107 R |
| 2,295,181 | A | * | 9/1942 | Moore ............... F16D 13/06 192/37 |
| 3,986,586 | A | * | 10/1976 | Mauger ............. F16D 49/16 188/264 R |
| 8,534,439 | B2 | * | 9/2013 | Gilmore ............ F16D 23/12 192/70.23 |
| 2014/0014455 | A1 | * | 1/2014 | Davis ................ F16D 15/00 192/45.1 |

\* cited by examiner

*Primary Examiner* — Mark A Manley
(74) *Attorney, Agent, or Firm* — Brooks Kushman P.C.

(57) ABSTRACT

A clutch includes an inner race and an outer race. The outer race has first and second portions that cooperate to define a split annulus with a gap defined between the first and second portions. A wedge element is radially disposed between the inner and outer races and is configured to lock the inner and outer races in response to the first and second portion being closed together.

20 Claims, 3 Drawing Sheets

WEDGE CLUTCH WITH CLAMSHELL CARRIER

TECHNICAL FIELD

The present disclosure relates to wedge clutches for coupling two or more components.

BACKGROUND

A vehicle powertrain may include a wedge clutch for coupling an input shaft to an output shaft. The wedge clutch includes an inner race connected to one of the shafts and an outer race connected to the other of the shafts. A wedge element is radially disposed between the inner and outer races and is configured to engage the inner and outer races when the clutch is locked to transmit power from the input shaft to the output shaft.

SUMMARY

According to one embodiment, a clutch includes an inner race and an outer race. The outer race has first and second portions that cooperate to define a split annulus with a gap defined between the first and second portions. A wedge element is radially disposed between the inner and outer races and is configured to lock the inner and outer races in response to the first and second portion being closed together.

According to another embodiment, a clutch includes a hub defining an outer surface and a clamshell carrier having first and second arcuate portions cooperating to form a split annulus with a gap defined between tips of the arcuate portions. The first and second arcuate portions are pivotally connected to each other and are movable between a closed position in which the gap has a first width and an open position in which the gap has a second width that is larger than the first. The first and second portions cooperate to define a circular groove. A wedge element is radially disposed between the hub and the clamshell carrier. The wedge element defines an inner surface seated on the outer surface of the hub and an outer surface at least partially disposed in the groove. The clutch is engaged to lock the hub to the clamshell carrier when the clamshell carrier is in the closed position and is disengaged to unlock the hub and the clamshell carrier when the clamshell carrier is in the open position.

According to yet another embodiment, a clutch includes an inner race and an outer race. The inner race has an outer surface defining ramps. The outer race has first and second portions pivotally attached to each other and movable between a closed position and an open position. The tips of the first and second portions are closer together in the closed position than in the open position. A wedge element is radially disposed between the inner and outer races and has an inner surface defining lobes that cooperate with the ramps to radially expand the wedge element to lock the inner and outer races in response to relative rotation between the inner race and the wedge element caused by the outer race being in the closed position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
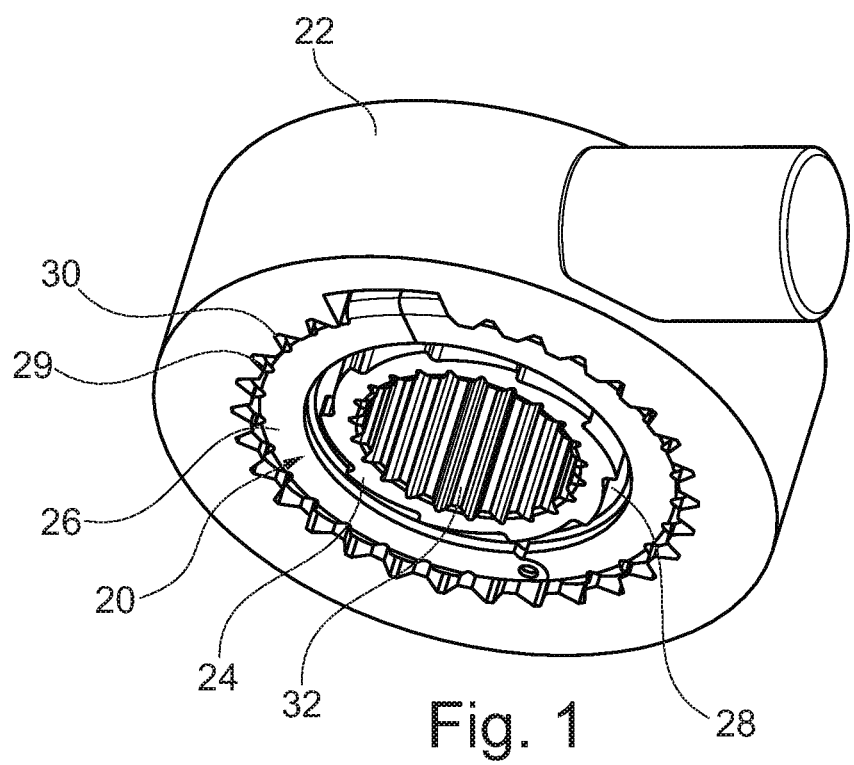
FIG. 1 is a perspective view of a wedge clutch.

Referring to FIG. 1, a wedge clutch 20 includes a hub 24 (also known as an inner race), a carrier 26 (also known as an outer race), and a wedge element 28 radially disposed between the hub 24 and the carrier 26. The hub 24, the carrier 26, and the wedge element 28 may all be concentric with each other and supported about a common axis. The wedge element 28 is configured to radially expand to rotationally lock the hub 24 to the carrier 26, in at least one direction, when the clutch is engaged and to allow independent rotation between the hub 24 and the carrier 26 when the clutch is disengaged. The carrier 26 may define splines 29 that are received in grooves 30 formed in a housing 22 to rotationally lock the carrier 26 to the housing 22. The housing 22 is schematically illustrated as a cylindrical body for simplicity, however, the housing 22 may be a transmission housing, a differential housing, a power-transfer unit housing, or any other housing found in vehicle powertrains. The hub 24 may define grooves 32 configured to connect with splines on a shaft. In the illustrated embodiment, the wedge clutch 20 is a one-way clutch that selectively locks the hub 24 to the housing 22 in one direction when the clutch is engaged and allows rotation of the hub 24 relative to the housing 22 in both directions when the clutch is disengaged. While described above as a brake for locking a shaft to a housing, the wedge clutch 20 may be utilized as a clutch to selectively couple at least two rotatable components to each other. The term "clutch" may include brakes and clutches. Furthermore, this disclosure is not limited to any particular application of the wedge clutch 20.

Referring to FIGS. 2A through 4B, the hub 24 includes an inner surface 34 that defines the spline grooves 32 and an outer surface 36. The wedge element 28 may include a cylindrical body 40 having an inner surface 42 that is received on the outer surface 36 of the hub 24 and an outer surface 46. The carrier 26 may include an inner surface 48 that receives a portion of the outer surface 46 of the wedge element 28. For example, the inner surface 48 of the carrier 26 may define a plurality of circular grooves 52 that are axially spaced from each other, and the outer surface 46 of the wedge element 28 may define a plurality of raised rings 54 that are axially spaced to align with the circular grooves 52. When assembled, each of the raised rings 54 are received in a corresponding one of the grooves 52. The raised rings 54 and the grooves 52 are configured to frictionally engage with each other to rotationally lock the wedge element 28 to the carrier 26 when the clutch 20 is engaged.

In the illustrated embodiment, the wedge clutch 20 is a one-way clutch that locks the hub 24 against rotation in a first direction 56 when the clutch 20 is engaged (also known as locked) and allows rotation of the hub 28 in the first direction 56 when the clutch is disengaged (also known as unlocked). The one-way clutch allows the hub 24 to freely rotate in a second direction 58 regardless of the engagement state of the clutch 20.

The outer surface 36 of the hub 24 is not a perfect circle and includes a cammed profile 60 having ramps 62 that extend radially outward from the center of the hub. Each ramp 62 may include a sloped surface 64 and a radial face 66. The inner surface of the wedge element 28 also has a cammed profile 68 having lobes 70 with a sloped surface 72 and a radially wall 74.

The cammed profiles 60 and 68 have substantially matching shapes such that the ramps 62 are received in the lobes 70 when the hub 24 and wedge element 28 are in a first rotational position relative to each other. In the first rotational position, which corresponds to a disengaged state of the clutch, the wedge element 28 is not expanded. When the wedge element 28 and hub 24 rotate relative to each other, the cammed profiles 60 and 68 become misaligned, i.e., the ramps 62 slide on the lobes 70, causing radial expansion of the wedge element 28. Radial expansion of the wedge element 28 causes the raised rings 54 to frictionally engage with the grooves 52 of the carrier 26. The wedge element 28 may include a slit 78 extending axially through the wedge element 28. The slit 78 facilitates the radial expansion of the wedge element 28.

Locking of the clutch 20 is initiated by decelerating the wedge element 28 relative to the hub 24 to misalign the cammed profiles 60, 68 causing radially expansion of the wedge element 28. This may be done by squeezing the wedge element 28 with the carrier 26. In the illustrated embodiment, the carrier 26 includes a first arcuate portion 80 and a second arcuate portion 82 that are pivotally connected by a hinge 84 and cooperate to form a split annulus having a gap 88 defined between tips 90, 92 of the arcuate portions 80, 82. This may be referred to as a clamshell carrier. The hinge 84 may include a pin 86 that extends through interleaved tabs of the first and second portions 80, 82. The first portion 80 and the second portion 82 may each form half of the carrier 26.

An actuator arrangement may be used to pivot the first and second portions 80, 82 relative to each other to increase or decrease a width of the gap 88. The actuator may be operable to move the carrier 26 between a closed position, e.g., FIG. 4A in which the gap 88 has a first width ($W_1$) and an open position, e.g., FIG. 4B, in which the gap 88 has a second width ($W_2$) that is wider than the first. In the closed position, the tips 90 and 92 are in close vicinity of each other but may or may not actually touch depending upon the design of the carrier. The scale of movement of the carrier 26 is greatly exaggerated for illustrative purposes. In some embodiments, the gap 88 may increase or decrease by 0.5-2 millimeters when switching between the open and closed positions.

Figure 2A:
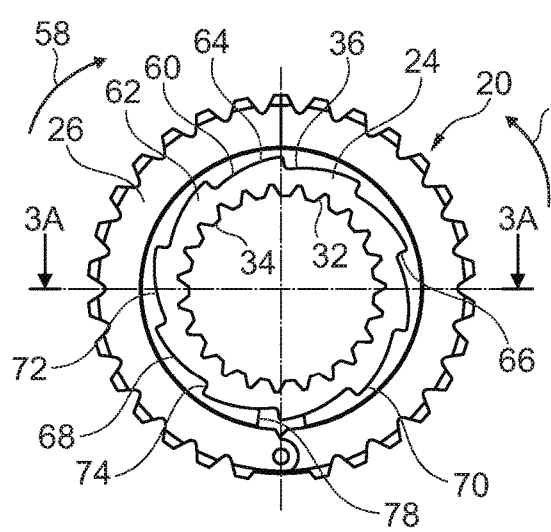
FIG. 2A is a front view of the wedge clutch with the carrier in the closed position.
Figure 2B:
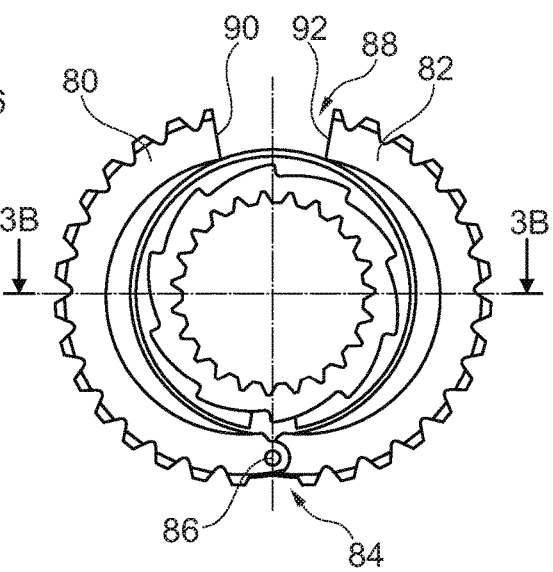
FIG. 2B is a front view of the wedge clutch with the carrier in the open position.
Figure 3A:
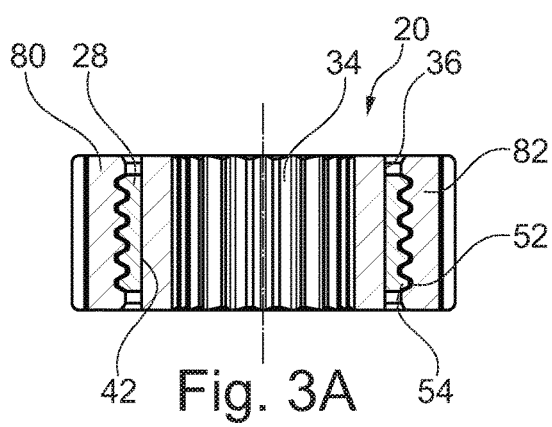
FIG. 3A is a cross-sectional view of the wedge clutch along cutline 3A-3A with the carrier in the closed position.
Figure 3B:
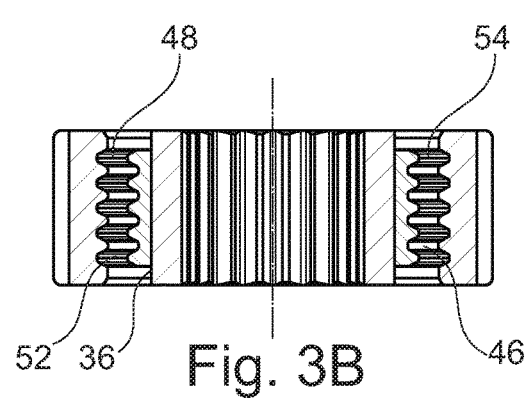
FIG. 3B is a cross-sectional view of the wedge clutch along cutline 3B-3B with the carrier in the open position.
Figure 4A:
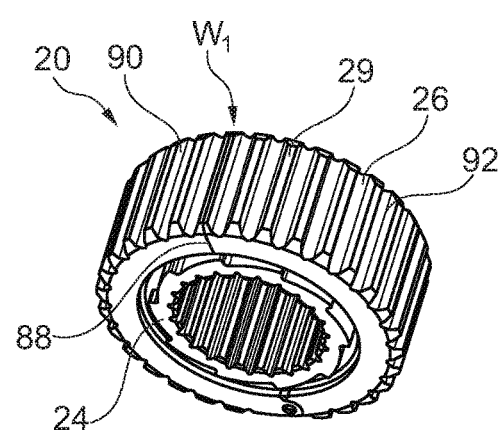
FIG. 4A is a perspective view of the wedge clutch with the carrier in the closed position.
Figure 4B:
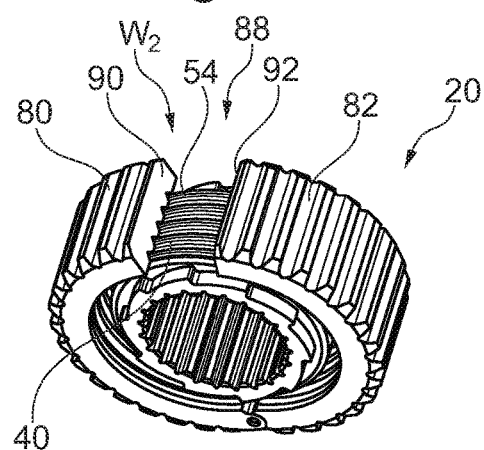
FIG. 4B is a perspective view of the wedge clutch with the carrier in the open position.

In FIG. 2B, the clutch 20 is illustrated in the unlocked state. If the hub 24 is rotating in the first direction 56, the clutch 20 can be engaged by moving the clamshell carrier 26 to the closed position (FIG. 2A) to squeeze the wedge element 28 causing the raised rings 54 to frictionally engage with the circular grooves 52. The friction force between the carrier 26 and the wedge element 28 decelerates the wedge element causing relative rotation between the wedge element 28 and the hub 28. When the wedge element 28 and the hub 24 rotate relative to each other, the cammed profiles 60 and 68 cooperate to radially expand the wedge element 28 further increasing the frictional engagement between the carrier and the wedge element causing the clutch 20 to lock. The clutch 20 is considered locked when the rotational speed difference between the hub 24 and the carrier 26 approximates zero.

Closing the carrier 26 will generally not prevent the hub 24 from rotating in the second direction 58 because the cammed profiles 60, 68 are designed to prevent relative rotation between the hub 24 and the wedge element 28 in that direction. Specifically, the radial faces 66 of the ramps engage with the radial walls 74 of the lobes causing the hub 24 and the wedge element 28 to rotate in unison in the second direction 58. Thus, the wedge element 28 will not radially expand, which is required to lock the clutch 20. While closing the carrier 26 will create drag on the hub 24 when rotating in the second direction 58, the drag is nominal compared to the operating torques of the hub 24. To reduce drag losses, the carrier 26 may be opened when the hub 24 is rotating in the second direction 58.

Figure 5:
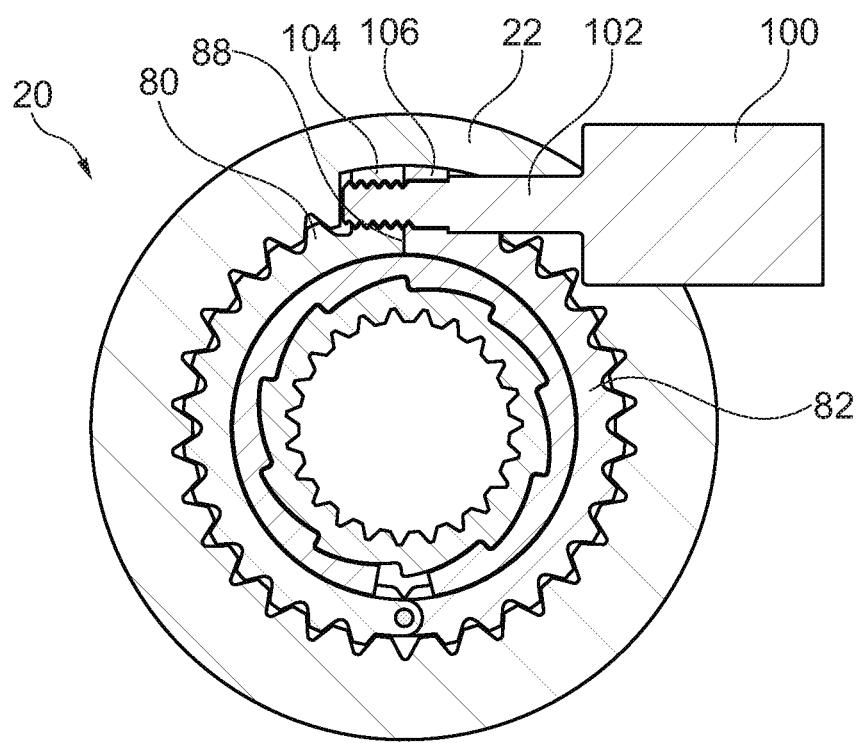
FIG. 5 is a front cross-sectional view of the wedge clutch.

Referring to FIG. 5, an actuator 100 may be used to pivot the first portion 80 and the second portion 82 to open and close the carrier 26. The actuator 100 may be an electric motor that is mounted to the housing 22. The first portion 80 may include a radially extending flange 104, and the second portion 82 may also include a radially extending flange 106 that is adjacent to the flange 104. The actuator 100 may include a spindle 102 that extends through holes defined in the flanges 104, 106. An end portion of the spindle 102 may have threads that engage with threads defined in the first flange 104. The threads cooperate to pivot the first portion 80 away from the second portion 82 to increase the gap 88 in response to the spindle 102 rotating in a first direction, and pivot the first portion 80 towards the second portion 82 to decrease the gap 88 in response to the spindle 102 rotating in a second direction.

FIG. 5 represents one of many possible actuator arrangements that may be used to actuate the carrier 26. In other embodiments, the flanges may project axially from the first and second arcuate portions 80, 82. The present disclosure is also not limited to electric motor actuators. For example, the clamshell carrier 26 can be actuated by a hydraulic or a magnetic actuator.

Figure 6:
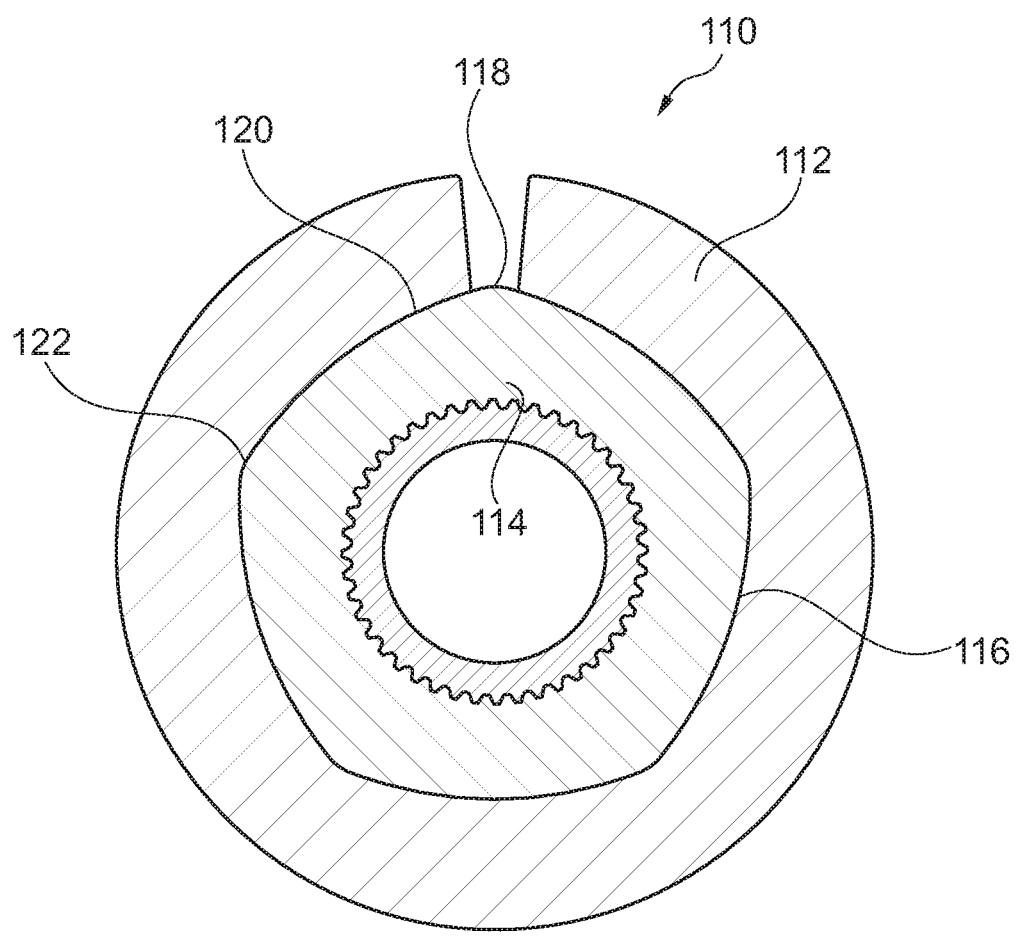
FIG. 6 is a front cross-sectional view of a wedge clutch according to another embodiment.

The teachings of the present disclosure are also applicable to bidirectional clutches. The structure of a one-way clutch and a bidirectional clutch may be the same except for the geometries of the cammed profiles. FIG. 6 illustrates example cammed profiles operable to lock the clutch in both directions of rotation.

Referring to FIG. 6, a bidirectional clutch 110 includes a wedge element 112 that may be similar to wedge element 28 except for the cammed profiles and a hub 114 that may be similar to hub 24 except for the cammed profiles. The wedge element 112 includes a cammed profile 116 having lobes 118 when the hub 114 and the wedge element 112 are in a first position. The hub 114 includes a cammed profile 120 having ramps 122 that are shaped to nest within the lobes 118. The lobes 118 and the ramps 122 cooperate to expand the wedge element 112 in response to relative rotation between the hub 114 and the wedge element 112 to engage the clutch. The ramps 122 and the lobes 118 of FIG. 6 are symmetrical unlike the ramps and lobes of the one-way clutch 20. Thus, the ramps 122 and the lobes 118 will radially expand the wedge element 112 in both directions of rotation. It is to be understood that any non-illustrated details of the clutch 110 may be the same or similar as those of clutch 20 previously described.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch comprising:
   a hub defining an outer circumferential surface having ramps;
   a clamshell carrier circumscribing the hub and including first and second arcuate portions cooperating to form a split annulus having a gap defined between tips of the arcuate portions, the first and second arcuate portions being pivotally connected to each other and movable between a closed position in which the gap has a first width and an open position in which the gap has a second width that is larger than the first width, wherein the first and second arcuate portions cooperate to define at least one circular groove; and
   a wedge element radially disposed between the hub and the clamshell carrier, the wedge element including a cylindrical body defining an outer circumferential surface having at least one raised ring disposed in the at least one groove and an inner circumferential surface having lobes that cooperate with the ramps to radially expand the wedge element from a contracted position to an expanded position in response to relative rotation between the inner race and the wedge element, wherein the least one raised ring is configured to frictionally lock with the at least one groove when in the expanded position, and the least one raised ring is configured to not frictionally lock with the at least one groove when in the contracted position; wherein
   the clutch is disengaged when the clamshell carrier is in the open position due to the lack of frictional engagement between the at least one raised ring and the at least one groove resulting in the wedge element biasing to the contracted position, and
   the clutch is engaged when the clamshell carrier is in the closed position due to the frictional engagement between the at least one raised ring and the at least one groove rotating the wedge element relative to the hub to expand the wedge element to the expanded position.

2. The clutch of claim 1, wherein the first and second arcuate portions are pivotally connected by a pin.

3. The clutch of claim 1, wherein the first and second arcuate portions cooperate to define a plurality of the circular grooves axially spaced from each other, and the wedge element defines a plurality of the raised rings each configured to frictionally engage with one of the grooves when the clamshell carrier is in the closed position.

4. The clutch of claim 1, wherein the first and second arcuate portions are first and second halves.

5. The clutch of claim 1, wherein the wedge element defines a slit extending axially through the cylindrical body.

6. The clutch of claim 1 further comprising an actuator arrangement configured to move the clamshell carrier between the closed position and the open position.

7. The clutch of claim 6, wherein the actuator arrangement includes a spindle threadably connected to one of the first and second arcuate portions such that rotation of the spindle moves the clamshell carrier between the open and closed positions.

8. The clutch of claim 6, wherein the first arcuate portion includes a first flange and the second arcuate portion includes a second flange, and wherein the actuator arrangement is connected to each of the flanges and is configured to push and pull the flanges relative to each other to move the clamshell carrier between the open and closed positions.

9. The clutch of claim 8, wherein the actuator arrangement includes an electric motor and a spindle that threadably engages with the first flange.

10. A clutch comprising:
    an inner race defining a cammed profile having radially extending ramps;
    an outer race including first and second portions that cooperate to define a split annulus with a first end defined on the first portion and second end defined on the second portion, wherein a gap is defined between the first and second ends; and
    a wedge element radially disposed between the inner and outer races, the wedge element defining a cammed profile having lobes that are configured to engage with the ramps to radially expand the wedge element in response to relative rotation between the inner race and the wedge element, wherein the wedge
    element is configured to lock the inner and outer races in response to the first and second ends being closed together.

11. The clutch of claim 10, wherein the outer race defines a groove and an outer edge of the wedge element is disposed in the groove.

12. The clutch of claim 10, wherein the wedge element defines a plurality of raised rings axially spaced from each other, and the outer race defines a plurality of circular grooves axially spaced from each other, and wherein each of the rings are disposed in one of the grooves and are configured to frictionally engage with the grooves when the carrier is closed.

13. The clutch of claim 10 further comprising an actuator arrangement configured to pivot the first and second portions relative to each other to engage and disengage the clutch.

14. The clutch of claim 10, wherein the first and second portions are joined at a hinge.

15. The clutch of claim 10, wherein the outer race has an outer surface defining teeth.

16. A clutch comprising:
    an inner race having an outer surface defining ramps;
    an outer race concentrically supported relative to the inner race so that the inner and outer races are rotatable relative to each other when the clutch is disengaged, the outer race including first and second portions pivotally attached to each other and movable between a closed position and an open position, wherein tips of the first and second portions are closer together in the closed position than in the open position; and a circular wedge element radially disposed between the inner and outer races and having an inner surface circumscribing the inner race, the wedge element defining lobes that cooperate with the ramps to radially expand the wedge element to lock the inner and outer races in response to relative rotation between the inner race and the wedge element caused by the outer race being in the closed position.

17. The clutch of claim 16, wherein the outer race defines a plurality of grooves and the wedge element defines a plurality of raised annular projections received in the grooves.

18. The clutch of claim 16 further comprising an actuator configured to pivot the first and second portions between the open and closed positions.

19. The clutch of claim 10, wherein the inner and outer races are supported for rotation relative to each other when the clutch is disengaged.

20. The clutch of claim 10, wherein the first and second portions include radially extending ends that define the gap therebetween.

\* \* \* \* \*